United States Patent
Decker et al.

(10) Patent No.: US 10,296,175 B2
(45) Date of Patent: May 21, 2019

(54) VISUAL PRESENTATION OF MULTIPLE INTERNET PAGES

(71) Applicants: Kevin Decker, San Jose, CA (US); John William Sullivan, Pacific Grove, CA (US)

(72) Inventors: Kevin Decker, San Jose, CA (US); John William Sullivan, Pacific Grove, CA (US)

(73) Assignee: Apple Inc., Cupertino, CA (US)

( * ) Notice: Subject to any disclaimer, the term of this patent is extended or adjusted under 35 U.S.C. 154(b) by 1147 days.

(21) Appl. No.: 13/729,706

(22) Filed: Dec. 28, 2012

(65) Prior Publication Data

US 2013/0191709 A1    Jul. 25, 2013

Related U.S. Application Data

(63) Continuation of application No. 12/242,708, filed on Sep. 30, 2008, now Pat. No. 8,347,230.

(51) Int. Cl.
*G06F 3/0483* (2013.01)
(52) U.S. Cl.
CPC ................................. *G06F 3/0483* (2013.01)
(58) Field of Classification Search
CPC .................................................... G06F 3/0483
USPC ....................................................... 715/830
See application file for complete search history.

(56) References Cited

U.S. PATENT DOCUMENTS

| | | |
|---|---|---|
| 5,581,681 A | 12/1996 | Tchao et al. |
| 5,590,256 A | 12/1996 | Tchao et al. |
| 5,874,953 A | 2/1999 | Webster et al. |
| 5,986,651 A | 11/1999 | Reber et al. |
| 6,061,062 A | 5/2000 | Venolia |
| 6,112,240 A | 8/2000 | Pogue et al. |
| 6,243,093 B1 * | 6/2001 | Czerwinski ......... G06F 3/04815 707/E17.142 |
| 6,486,895 B1 * | 11/2002 | Robertson ......... G06F 17/30873 707/E17.111 |

(Continued)

OTHER PUBLICATIONS

"U.S. Appl. No. 10/775,941, Response to Non-Final Office Action dated May 2, 2007", 15 pgs.

(Continued)

*Primary Examiner* — Kyle R Stork
*Assistant Examiner* — Henry Orr
(74) *Attorney, Agent, or Firm* — Fernando & Partners, LLP; William J. Higley

(57) ABSTRACT

A novel method for graphically organizing and displaying multiple pages of internet content based on how the page was accessed. Pages are determined to be indirectly accessed if they were accessed via a hypertext link or a trail of hypertext links. Pages are determined to be directly accessed if accessed via other means, such as a bookmark or via Uniform Resource Locator (URL). Page groupings are created for each directly accessed page, and each indirectly accessed page is categorized into a grouping associated with a directly accessed page containing a link through which the indirectly accessed page was accessed. The web pages are presented to the user in an interface that is a graphical representation of the page groupings, wherein a user selects a page to view by first selecting the page's page grouping and then selecting the page.

24 Claims, 5 Drawing Sheets

(56) References Cited

U.S. PATENT DOCUMENTS

| | | | |
|---|---|---|---|
| 7,325,202 B2* | 1/2008 | Shirriff | G06F 17/30899 707/E17.119 |
| 7,373,614 B1 | 5/2008 | Holmes | |
| 7,735,018 B2 | 6/2010 | Bakhash | |
| 7,966,564 B2 | 6/2011 | Catlin et al. | |
| 8,095,644 B2 | 1/2012 | Papadimitriou et al. | |
| 8,339,367 B2* | 12/2012 | Dods | 345/169 |
| 8,347,230 B2 | 1/2013 | Decker et al. | |
| 2002/0147805 A1* | 10/2002 | Leshem | G06F 11/32 709/223 |
| 2003/0131097 A1 | 7/2003 | Kasriel et al. | |
| 2003/0154203 A1* | 8/2003 | Morris | H04N 21/643 |
| 2004/0003351 A1 | 1/2004 | Sommerer et al. | |
| 2004/0113948 A1* | 6/2004 | Shahrbabaki | G06F 3/0483 715/777 |
| 2004/0125124 A1 | 7/2004 | Kim et al. | |
| 2004/0169677 A1 | 9/2004 | Utsuki et al. | |
| 2004/0189696 A1* | 9/2004 | Shirriff | G06F 17/30899 715/738 |
| 2004/0243938 A1 | 12/2004 | Weise et al. | |
| 2005/0086613 A1 | 4/2005 | McKnight et al. | |
| 2005/0091596 A1* | 4/2005 | Anthony | G06F 3/04815 715/712 |
| 2005/0132297 A1 | 6/2005 | Milic-Frayling et al. | |
| 2005/0257400 A1* | 11/2005 | Sommerer | G06F 17/30873 36/13 |
| 2006/0048076 A1* | 3/2006 | Vronay | G06F 3/0482 715/850 |
| 2006/0074929 A1* | 4/2006 | Weber | G06F 17/30067 |
| 2006/0125803 A1* | 6/2006 | Westerman et al. | 345/173 |
| 2006/0184537 A1* | 8/2006 | Sauve | G06F 17/30899 |
| 2006/0210958 A1* | 9/2006 | Rimas-Ribikauskas et al. | 434/362 |
| 2006/0268100 A1* | 11/2006 | Karukka | G06F 3/0482 348/14.01 |
| 2007/0070066 A1* | 3/2007 | Bakhash | G06F 3/04815 345/419 |
| 2007/0094208 A1* | 4/2007 | Cerrato | G06F 21/316 706/48 |
| 2007/0266334 A1* | 11/2007 | Donaldson | G06F 3/03547 715/777 |
| 2008/0005686 A1* | 1/2008 | Singh | G06F 3/0483 715/764 |
| 2008/0046425 A1* | 2/2008 | Perski | 707/6 |
| 2008/0091596 A1 | 4/2008 | Labaton | |
| 2008/0165255 A1* | 7/2008 | Christie et al. | 348/207.99 |
| 2008/0235632 A1 | 9/2008 | Holmes | |
| 2009/0327947 A1* | 12/2009 | Schreiner | G06F 3/0483 715/777 |
| 2010/0020025 A1* | 1/2010 | Lemort et al. | 345/173 |
| 2010/0083179 A1 | 4/2010 | Decker et al. | |
| 2011/0066984 A1* | 3/2011 | Li | 715/863 |
| 2011/0306304 A1* | 12/2011 | Forutanpour et al. | 455/67.11 |
| 2011/0310005 A1* | 12/2011 | Chen et al. | 345/156 |
| 2012/0131513 A1* | 5/2012 | Ansell | 715/863 |
| 2012/0131514 A1* | 5/2012 | Ansell et al. | 715/863 |
| 2012/0254809 A1* | 10/2012 | Yang et al. | 715/863 |

OTHER PUBLICATIONS

"U.S. Appl. No. 10/775,941, Notice of Allowance dated Jan. 7, 2008", NOAR, 7 pgs.

"U.S. Appl. No. 12/110,945 , Response filed Aug. 3, 2011 to Non Final Office Action dated May 3, 2011", 13 pgs.

"U.S. Appl. No. 12/110,945, Final Office Action dated Oct. 6, 2011", 25 pgs.

"U.S. Appl. No. 12/110,945, Final Office Action dated Nov. 23, 2010", 17 pgs.

"U.S. Appl. No. 12/110,945, Non Final Office Action dated May 3, 2011", 17 pgs.

"U.S. Appl. No. 12/110,945, Non-Final Office Action dated Mar. 8, 2010", 21 pgs.

"U.S. Appl. No. 12/110,945, Notice of Allowance dated Apr. 17, 2012", 9 pgs.

"U.S. Appl. No. 12/110,945, Preliminary Amendmend filed Jul. 11, 2008", 7 pgs.

"U.S. Appl. No. 12/110,945, Response filed Mar. 6, 2012 to Final Office Action dated Oct. 6, 2011", 12 pgs.

"U.S. Appl. No. 12/110,945, Response filed Mar. 23, 2011 to Final Office Action dated Nov. 23, 2010", 10 pgs.

"U.S. Appl. No. 12/110,945, Response filed Sep. 8, 2010 to Non Final Office Action dated Mar. 8, 2010", 13 pgs.

"U.S. Appl. No. 12/242,708, Advisory Action dated Oct. 27, 2011", 3 pgs.

"U.S. Appl. No. 12/242,708, Examiner Interview Summary dated May 17, 2012", 3 pgs.

"U.S. Appl. No. 12/242,708, Final Office Action dated Jul. 14, 2011", 12 pgs.

"U.S. Appl. No. 12/242,708, Non Final Office Action dated Feb. 4, 2011", 12 pgs.

"U.S. Appl. No. 12/242,708, Non Final Office Action dated Feb. 15, 2012", 14 pgs.

"U.S. Appl. No. 12/242,708, Notice of Allowance dated Aug. 30, 2012", 8 pgs.

"U.S. Appl. No. 12/242,708, Response filed May 4, 2011 to Non Final Office Action dated Feb. 4, 2011", 12 pgs.

"U.S. Appl. No. 12/242,708, Response filed May 15, 2012 to Non Final Office Action dated Feb. 15, 2012", 13 pgs.

"U.S. Appl. No. 12/242,708, Response filed Oct. 13, 2011 to Final Office Action dated Jul. 14, 2011", 11 pgs.

"Final-Office Action dated Oct. 1, 2007 in U.S. Appl. No. 10/775,941", FOAR, 19 pgs.

* cited by examiner

VISUAL PRESENTATION OF MULTIPLE INTERNET PAGES

CLAIM OF PRIORITY

This application is a continuation of and claims the benefit of priority under 35U.S.C. § 120 to U.S. patent application Ser. No. 12/242,708, filed on Sep. 30, 2008, the benefit of priority of which is claimed hereby and is incorporated herein by reference in its entirety.

FIELD OF THE INVENTION

Embodiments relate generally to the field of internet browsing. More particularly, embodiments relate to a method and a system for organizing and presenting internet content based on the avenue through which the content is accessed.

BACKGROUND OF THE INVENTION

One of the most important and common functions of modern personal computers is providing access to and presenting Internet content. Internet content is typically provided and presented to users by means of an internet browser, such as SAFARI® made by APPLE® Inc., of Cupertino, Calif. or FIREFOX® made by MOZILLA® Corp., of Mountain View, Calif. or INTERNET EXPLORER® made by MICROSOFT® Corp., of Redmond, Wash.

The increasingly commonplace use of internet browsers and the concomitant growth in quality, quantity, and linkage of Internet content has led to new expectations regarding the ease of navigating the wealth of information found on the internet. With the advent of more sophisticated websites, many of which provide extensive useful content, updated daily or more often, users of internet browsers have begun accessing internet content in new ways. Whereas users once accessed single websites as destinations, perhaps following one or two of the hypertext links therein, users are now more likely to access particular websites as entry points.

For example, news organizations have built elaborate websites that rival print media in currency and usability. Users may access such a site and find many articles worth reading, each of which is contained in a separate webpage. Furthermore, increasingly savvy authors pepper these articles with hyper-text links to related articles, original sources, or other content of interest, each of which is contained in a separate webpage.

Another developing internet use model involves what are known in the art as "aggregators." Aggregators are websites that perform the function of allowing users to customize what content should be accessible and linked to from the user's customized view of the website. Aggregators are typically used to provide a single point of access to a customized plurality of content-providing web pages to which new content is added regularly, such as web-logs (blogs) and news sites.

The result of these shifting use patterns is that users are now more likely to access many web pages in parallel, rather than sequentially. As a result, the first model of presenting web content, in which new pages were always opened in new graphical user interface (GUI), windows became inadequate. Having more than one or two web browser windows open is distracting and difficult to manage. The traditional means of switching between GUI windows often identified different windows with only a title, containing the name of the application, which does not provide enough information to the user looking for a window containing a particular web page. Even if more information is included in the title, the information is largely limited to textual information, which can be inadequate or cumbersome to use. Within the multiple-window model, a user cannot easily find a particular web page when he or she has many pages open concurrently.

Thus, an improved model for presenting multiple pages of web content became popular. This model, known in the art as "tabbed browsing," is so named because of the multiple tabs in which a user is provided with content. This prior art presentation of multiple pages of internet content is illustrated in FIG. 1. User display 100 is a typical view of the tabbed browsing model. In this model, multiple web pages are all viewable within a single GUI window, user display 100. The content of the pages is viewable one page at a time, and the view can be switched from one page to another via tabs. Thus, in the figure, the content, 105, of PAGE 3 is being viewed. PAGE 1, PAGE 2, and PAGE 4 are presented in tabs, 101, 102, and 104, respectively. A user can view the content of PAGE 1, for example, by selecting its tab, 101, with the cursor, 110.

Unfortunately, tabbed browsing continues to present drawbacks similar to those of the model upon which it sought to improve. Chiefly, a user still cannot easily find a particular web page when he or she has many pages open concurrently. In FIG. 1, only 4 pages are open, and so the interface is manageable. However, once the number of open pages is doubled, or tripled, as is not uncommon for modern internet users, tabbed browsing becomes just as cumbersome as its predecessor model. As there is limited room for tabs, an interface such as the one illustrated in FIG. 1 presents a problem when more web pages are accessed than there is room to display tabs. One solution is to shrink the width of the tabs, which results in their titles being unreadable and leaving the user with no way to identify which tab corresponds to a particular web page for which he or she is searching. An alternative is to allow the tabs to extend off the screen, and provide some means to scroll through them. However, scrolling is not an ideal method of searching for a particular textual title. Indeed, tabbed browsing continues to present a model in which a user must identify a web page based solely on the title of that webpage, when titles often do not provide adequate distinctions between open pages.

SUMMARY OF THE DESCRIPTION

A method for graphically organizing and displaying multiple pages of internet content based on how the page was accessed is described. Pages are determined to be indirectly accessed if they were accessed via a hypertext link or a trail of hypertext links. Pages are determined to be directly accessed if accessed via other means, such as a bookmark or via Uniform Resource Locator (URL). Page groupings are created for each directly accessed page, and each indirectly accessed page is categorized into a grouping associated with a directly accessed page containing a link through which the indirectly accessed page was accessed. The web pages are presented to the user in an interface that is a graphical representation of the page groupings, wherein a user selects a page to view by first selecting the page's page grouping and then selecting the page.

BRIEF DESCRIPTION OF THE DRAWINGS

The embodiments of the present invention are illustrated by way of example and not limitation in the figures of the accompanying drawings, in which like references indicate similar elements and in which.

DETAILED DESCRIPTION

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

In general, the embodiments described below describe methods and systems for organizing multiple pages of web content and presenting them to a user in a graphical representation of the organization. Specifically, in various embodiments, pages are categorized as either "directly accessed" or "indirectly accessed." A page is considered indirectly accessed if the user accessed the page by clicking on a hypertext link or a series of such links. If a page was accessed by other means, such as by requesting it via its Uniform Resource Locator (URL) (e.g. typing or copying and pasting the URL into a text entry filed) or by requesting it via a bookmark, it is considered directly accessed. Once the pages are categorized, they are assigned to page groupings. In various embodiments, one page grouping is created for each of the directly accessed pages, such that there is a one-to-one relationship between page groupings and directly accessed pages. Each of the indirectly accessed pages is then assigned to one of these groupings based on the link or series of links through which the indirectly accessed page was accessed. To be more precise, each of these pages is assigned to the grouping associated with the directly accessed page containing the link or a link in the series of links through which the indirectly accessed page was accessed.

Figure 1:
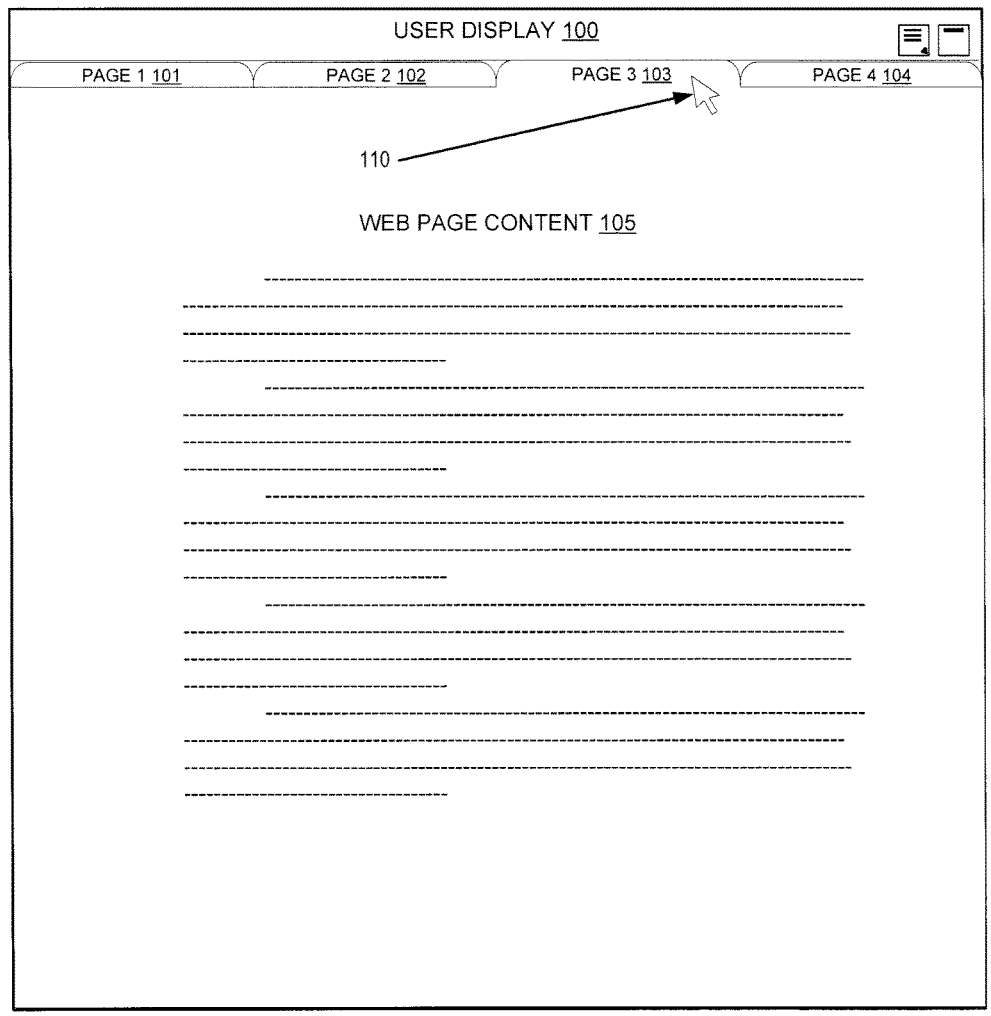
FIG. 1 is a block diagram of a prior art model for presenting a user with multiple pages of internet content.
Figure 2A:
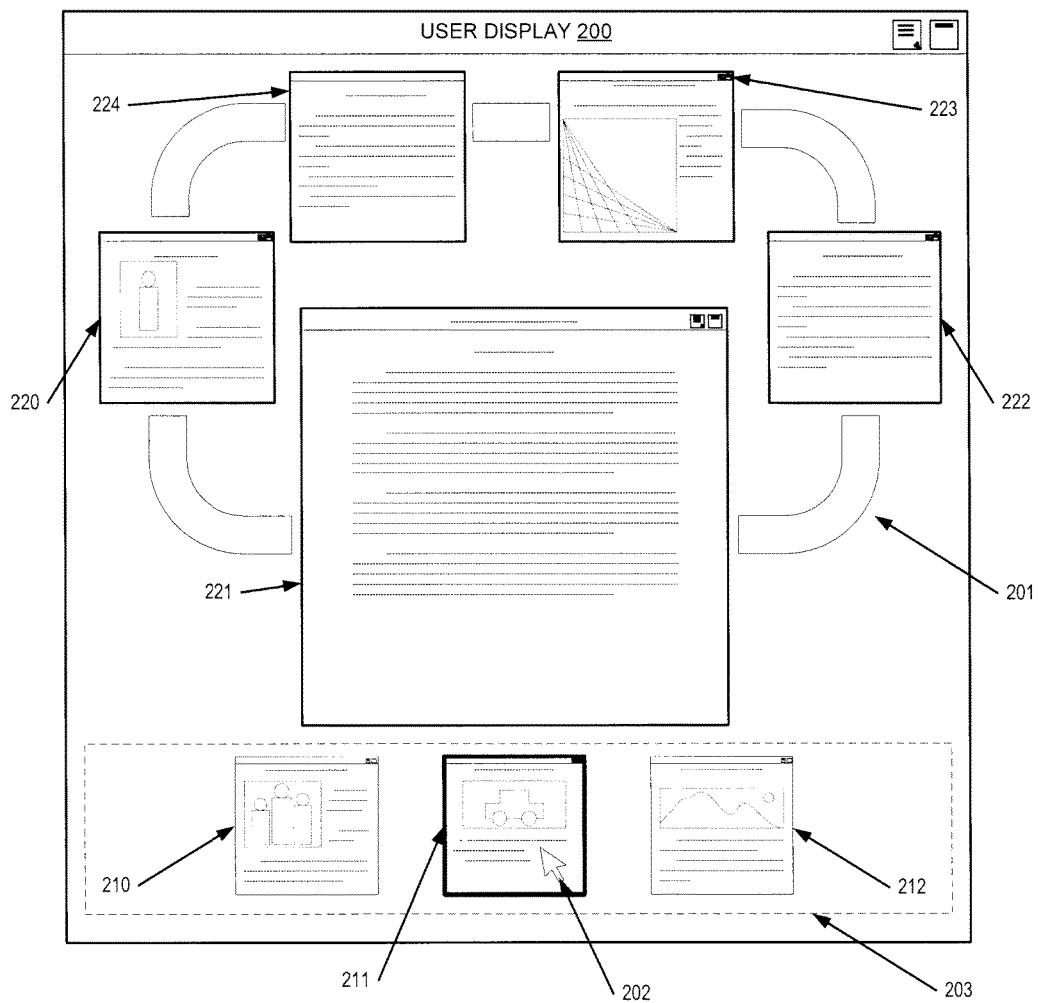
FIG. 2a is a block diagram of a first view of a user interface implementing the claimed model for presenting a user with multiple pages of internet content, according to various embodiments.
Figure 2B:
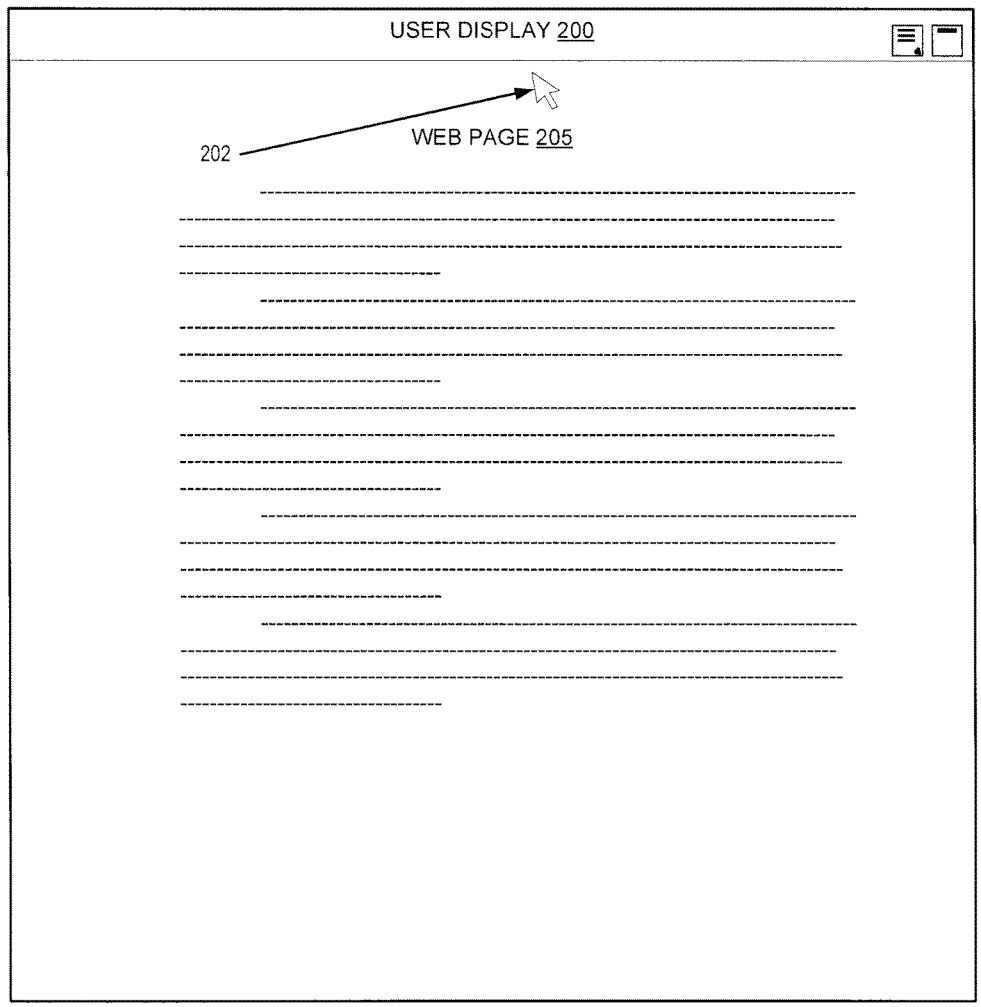
FIG. 2b is a block diagram of a second view of a user interface implementing the claimed model for presenting a user with multiple pages of internet content, according to various embodiments.

FIGS. 2A-B illustrate two views of one implementation of the described method of presenting multiple web pages to a user. The following descriptions of these figures make use of the term "snapshot." A "snapshot" of a webpage should be read to mean a scaled down representation of the webpage as it would appear in a normal browser window. A snapshot is analogous to what is known in the art as a "thumbnail" representation. In one embodiment, the snapshot or thumbnail can be a static view of the webpage as it appeared when initially accessed. In another embodiment, the snapshot or thumbnail can be a dynamic view of the webpage such that it is updated as the user interacts with it, for example, by scrolling.

User display 200 shows a web browser interface with a GUI representation of five page groupings, 220, 221, 222, 223, and 224. The page groupings are represented as snapshots of the directly accessed page associated with each group. Element 201 represents a carousel-type mechanism for switching between page groupings. Page grouping representations 220, 221, 222, 223, and 224 are displayed as rotating through the "carousel" represented by element 201. Carousel 201 has a distinct front position in which the page grouping representation is viewed as distinctly larger than the other page grouping representations. As can be seen in the figure, page grouping 221 is in the front position, and is represented as much larger than page groupings 220, 222, 223, and 224. A user can rotate another page grouping to the front position by selecting it with the cursor, 202.

The front position, where page grouping 221 is located in this illustration, may be made distinct from other carousel positions by other means than as displayed in FIG. 2A. For example, the front position may be nearer the top of the carousel, or to the side. Alternatively, it may not be distinctly larger, but instead highlighted with a special border. One of skill in the art will appreciate that there exist many means to graphically make one element distinct from other similar elements. The use of any other means than the one illustrated should not be construed as a departure from the spirit of the invention.

Element 203 is the area of user display 200 for displaying snapshots of the indirectly accessed pages associated with the page grouping in the front position. In the figure, elements 210, 211, and 212 are the indirectly accessed pages associated with page grouping 221, which is visually represented by the directly accessed page in the grouping. When another page grouping is rotated to the front position by a user selecting with the cursor 202, the snapshots in area 203 transition to the snapshots of the indirectly accessed pages associated with the page grouping rotated into the front position.

A user selects an indirectly accessed web page for full-scale viewing by selecting it with the cursor 202 while it is displayed in area 203. A user selects a directly accessed web page for full- scale viewing by selecting it with the cursor 202 when it is in the front position of the carousel. Selecting a directly accessed web page that is not in the front position of the carousel will rotate that page into the front position. Thus, to view a page, a user selects the associated page grouping to rotate it to the front, then selects a page from the selected grouping.

In the illustrated embodiment, when a web page is selected for full-scale viewing, it is displayed as shown in FIG. 2B. Web page 205 is shown in user display 200 in the entire visible area. Varying implementations enable the user to return to the interface illustrated in FIG. 2A in varying ways. For example, a user might use a keyboard command, or what is known in the art as a "gesture" made with the pointing device, or cursor 202. Alternatively, user interface 200 may have a menu item or toolbar button that may be selected by cursor 202 to return to the interface in FIG. 2A.

The interfaces shown in FIGS. 2A-B are simply one implementation of a display creating a visual representation of the page groupings. As one who is skilled in the art may easily observe, alternate implementations can be employed to represent the same organization scheme. For example, the page groupings might be displayed in a horizontal or vertical film-strip style list of snapshots in the interface, with the indirectly accessed pages associated with the selected page grouping displayed in the carousel. Alternatively, the page groupings and associated indirectly accessed pages may be represented as lists within adjacent frames in user interface 200. Yet another implementation could be achieved by mimicking the COVER FLOW® interface featured in the iTUNES® music player made by APPLE®, Inc. of Cupertino, Calif. Yet other embodiments might include displaying page groupings in a 3D view. Further variations are possible without departing from the spirit of the claimed invention.

Figure 3:
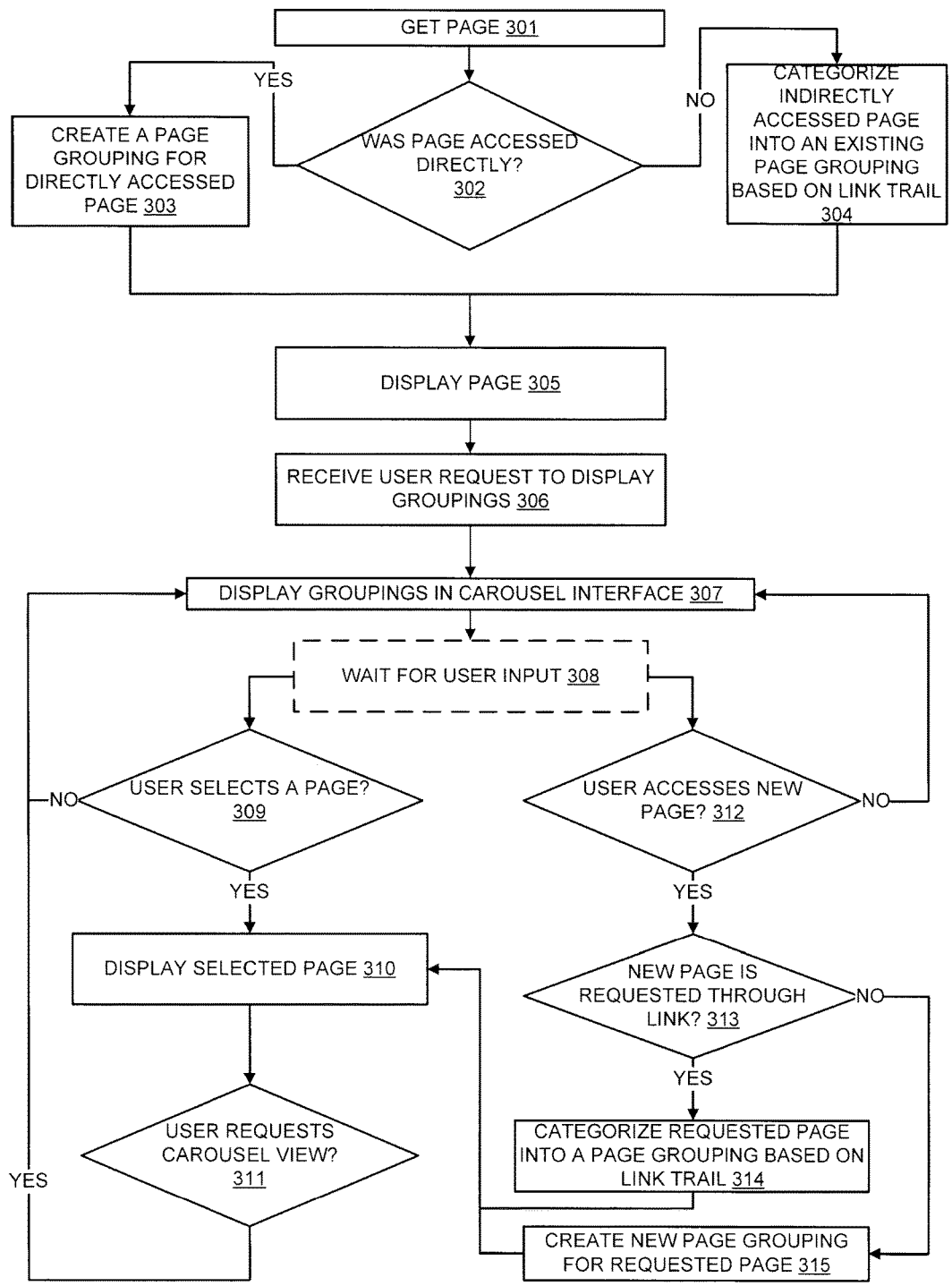
FIG. 3 is a flow diagram of a method for organizing multiple web pages for presentation to a user, according to various embodiments.

FIG. 3 illustrates a flow diagram of an embodiment of a method for organizing multiple web pages for presentation to a user and displaying them according to the implementation illustrated in FIGS. 2A-B. At 301, the method begins with getting a page that a user accesses. At 302 the method determines whether the page was accessed directly. If so, a page grouping is created for that page at 303. Otherwise, the page was accessed indirectly and the page is categorized, at 304, into an existing page grouping based on which directly accessed page contains a link through which the indirectly accessed page was accessed. At 305, the page is displayed at full-scale. At 306, the method receives a user request to display the page groupings, resulting in display of the carousel interface at 307.

At 308, the method waits for user input. If a user selects a page for full-scale viewing, at 309, the page is displayed at 310. Then, when the user requests the carousel view at 311, the carousel representation is displayed again, in 307, as before. If, instead, the user accesses a new page, 312, the method determines at 313 whether the page is accessed through a link, and categorizes the page accordingly. If the page was accessed through a link, it is categorized into the page grouping associated with the page containing that link, at 314. Otherwise, a new page grouping is created for the newly accessed page, at 315. In either case, the page is then displayed, in 310, as before.

Figure 4:
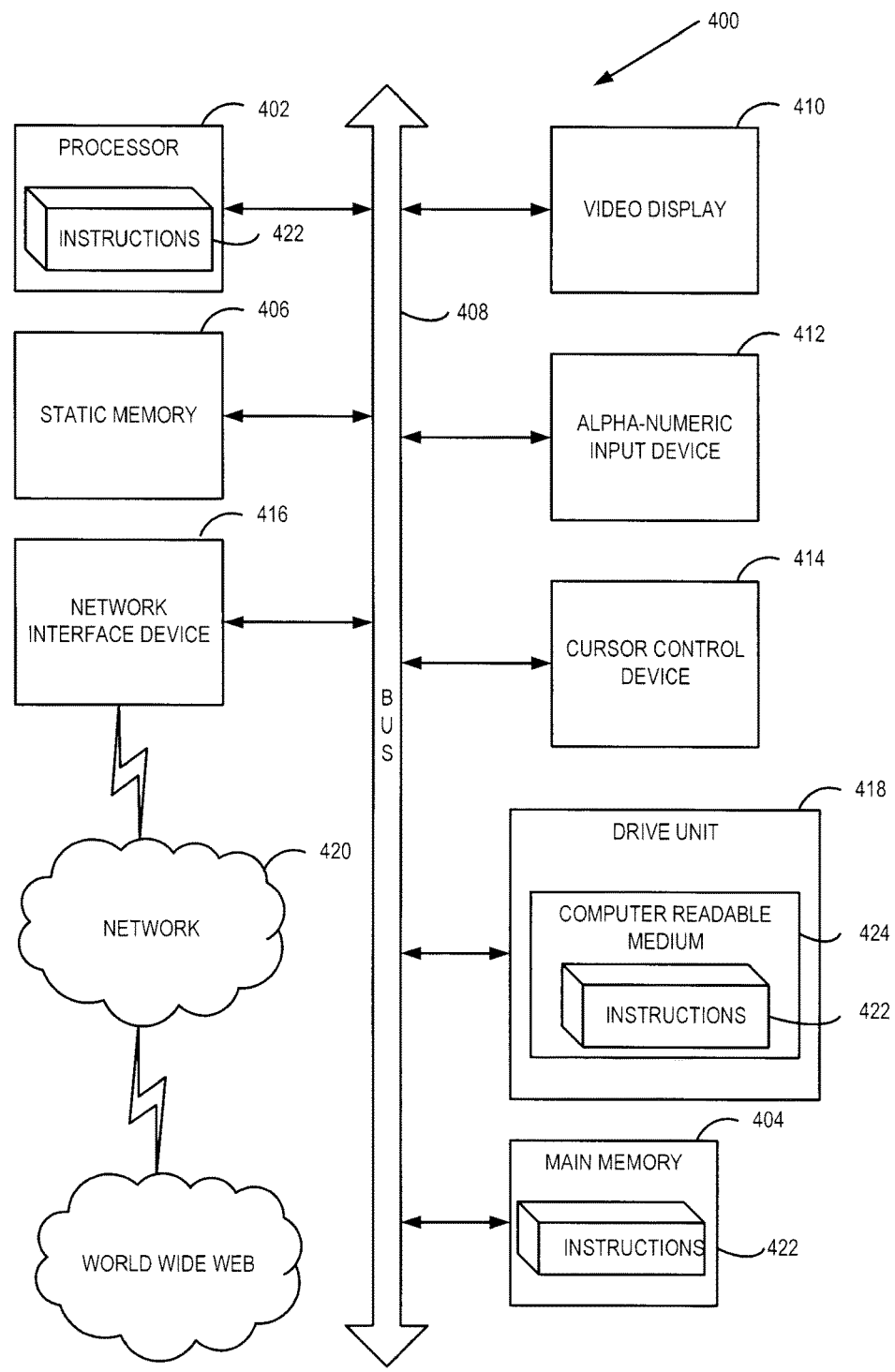
FIG. 4 is a block diagram of a computing device on which embodiments of the invention may be implemented.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 126 for performing the operations and steps discussed herein.

The computer system 400 may further include a network interface device 416. The computer system 400 also may include a video display unit 410 (e.g., a liquid crystal display (LCD) or a cathode ray tube (CRT)), an alphanumeric input device 412 (e.g., a keyboard), and a cursor control device 414 (e.g., a mouse)

The secondary memory 418 may include a machine-readable storage medium (or more specifically a computer-readable storage medium) 424 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 416.

While the machine-readable storage medium 424 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The present invention also relates to a system for performing the operations herein. This system may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more a specialized system to perform the required operations of the method. Structure for a variety of these systems will appear as set forth in the description below. In addition, the present invention is not described with reference to any particular programming language or operating system. It will be appreciated that a variety of programming languages may be used to implement the teachings of the invention as described herein, and the teachings may be implemented within a variety of operating systems.

The operations and functions described herein can be implemented as software modules, hardware modules, special-purpose hardware (e.g., application specific hardware, application specific integrated circuits (ASICs), digital signal processors (DSPs), etc.), embedded controllers, hard-wired circuitry, etc.

Aside from what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   displaying a first graphical user interface (GUI) generated by a browser, wherein the first GUI includes a plurality of tabs corresponding to a plurality of web pages that are concurrently open in the browser;
   while the plurality of web pages are concurrently open in the browser, detecting a user request to display a second GUI that corresponds to presentation of page groupings of the plurality of web pages that are concurrently open in the browser; and
   in response to detecting the user request:
      determining whether web pages of the plurality of web pages were accessed directly or indirectly, wherein a web page is determined to have been accessed indirectly if accessed by clicking on one or more hyperlinks and a web page is determined to have been accessed directly if accessed without clicking on one or more hyperlinks, wherein the plurality of web pages that are concurrently open in the browser include at least a first directly accessed page corresponding to a first tab of the plurality of tabs, a second directly accessed page corresponding to a second tab of the plurality of tabs, a first indirectly accessed page corresponding to a third tab of the plurality of tabs that was accessed via a link in the first directly accessed page, and a second indirectly accessed page corresponding to a fourth tab of the plurality of tabs that was accessed via a link in the second directly accessed page,
      grouping the plurality of web pages into a plurality of page groups, including: a first page group containing the first directly accessed page and the first indirectly accessed page that was accessed via a link in the first directly accessed page; and a second page group containing the second directly accessed page and the second indirectly accessed page that was accessed via a link in the second directly accessed page, and
   ceasing to display the first GUI,
   displaying the second GUI that includes displaying a first region that includes a snapshot of the first directly accessed page and a snapshot of the second directly accessed page, wherein the snapshot of the first directly accessed page is displayed in a designated location that is visually distinct from other snapshots associated with other directly accessed web pages within the first region; and
   in accordance with a determination that the snapshot of the first directly accessed page is displayed in the designated location:
      displaying a snapshot of the first indirectly accessed page that is assigned to the first page group in a second region of the second GUI, wherein the second region is visually separated from the first region within the second GUI, and
      forgoing display of a snapshot of the second indirectly accessed page that is assigned to the second page group.

2. The method of claim 1, wherein a page of the plurality of web pages is determined to be indirectly accessed if the page was accessed by clicking on a hypertext link or a series of hypertext links.

3. The method of claim 1, wherein a page of the plurality of web pages is determined to be directly accessed if the page was accessed by requesting the page through direct entry of a uniform resource locator associated with the page or using a bookmark.

4. The method of claim 1, wherein the snapshot of the first directly accessed page is displayed in a distinguishing manner relative to the snapshot of the second directly accessed page while displayed in the designated location.

5. The method of claim 1, wherein the plurality of web pages is actively open in tabs in a browser session.

6. The method of claim 1, further comprising receiving a request to open a webpage from a second link in the first directly accessed webpage, and in response, opening the webpage and adding the webpage to the first page group.

7. The method of claim 1, wherein the snapshot of the first directly accessed page and the snapshot of the second directly accessed page are displayed in a carousel within the first region of the second GUI.

8. The method of claim 1, further comprising, in response to the user request:
   in accordance with a determination that the snapshot of the second directly accessed page is displayed in the designated location:
      displaying the snapshot of the second indirectly accessed page that is assigned to the second page group in the second region of the second GUI; and
      forgoing display of the snapshot of the first indirectly accessed page that is assigned to the first page group.

9. The method of claim 8, further comprising:
while the snapshot of the first directly accessed page in displayed in the designated location, receiving a user input indicative of the snapshot of the second directly accessed page; and
in response to receiving the user input indicative of the snapshot of the second directly accessed page, displaying the snapshot of the second directly accessed page in the designated location.

10. A non-transitory computer-readable storage medium that provides instructions, which when executed by a set of processors, cause said set of processors to perform operations comprising:
displaying a first graphical user interface (GUI) generated by a browser, wherein the first GUI includes a plurality of tabs corresponding to a plurality of web pages that are concurrently open in the browser;
while the plurality of web pages are concurrently open in the browser, detecting a user request to display a second GUI that corresponds to presentation of page groupings of the plurality of web pages that are concurrently open in the browser; and
in response to detecting the user request:
determining whether web pages of the plurality of web pages were accessed directly or indirectly, wherein a web page is determined to have been accessed indirectly if accessed by clicking on one or more hyperlinks and a web paqe is determined to have been accessed directly if accessed without clicking on one or more hyperlinks, wherein the plurality of web pages that are concurrently open in the browser include at least a first directly accessed page corresponding to a first tab of the plurality of tabs, a second directly accessed page corresponding to a second tab of the plurality of tabs, a first indirectly accessed page corresponding to a third tab of the plurality of tabs that was accessed via a link in the first directly accessed page, and a second indirectly accessed page corresponding to a fourth tab of the plurality of tabs that was accessed via a link in the second directly accessed page,
grouping the plurality of web pages into a plurality of page groups, including: a first page group containing the first directly accessed page and the first indirectly accessed page that was accessed via a link in the first directly accessed page; and a second page group containing the second directly accessed page and the second indirectly accessed page that was accessed via a link in the second directly accessed page, and ceasing to display the first GUI,
displaying the second GUI that includes displaying a first region that includes a snapshot of the first directly accessed page and a snapshot of the second directly accessed page, wherein the snapshot of the first directly accessed page is displayed in a designated location that is visually distinct from other snapshots associated with other directly accessed web pages within the first region; and
in accordance with a determination that the snapshot of the first directly accessed page is displayed in the designated location:
displaying a snapshot of the first indirectly accessed page that is assigned to the first page group in a second region of the second GUI, wherein the second region is visually separated from the first region within the second GUI, and
forgoing display of a snapshot of the second indirectly accessed page that is assigned to the second page group.

11. The computer-readable storage medium of claim 10, wherein the snapshot of the first directly accessed page is displayed in a distinguishing manner relative to the snapshot of the second directly accessed page while displayed in the designated location.

12. The computer-readable storage medium of claim 10, wherein the plurality of web pages is actively open in tabs in a browser session.

13. The computer-readable storage medium of claim 10, further comprising the operation of receiving a request to open a webpage from a second link in the first directly accessed webpage, and in response, opening the webpage and adding the webpage to the first page group.

14. The computer-readable storage medium of claim 10, wherein the snapshot of the first directly accessed page and the snapshot of the second directly accessed page are displayed in a carousel within the first region of the second GUI.

15. The computer-readable storage medium of claim 10, wherein the operations further comprise, in response to the user request:
in accordance with a determination that the snapshot of the second directly accessed page is displayed in the designated location:
displaying the snapshot of the second indirectly accessed page that is assigned to the second page group in the second region of the second GUI; and
forgoing display of the snapshot of the first indirectly accessed page that is assigned to the first page group.

16. The computer-readable storage medium of claim 15, wherein the operations further comprise:
while the snapshot of the first directly accessed page in displayed in the designated location, receiving a user input indicative of the snapshot of the second directly accessed page; and
in response to receiving the user input indicative of the second directly accessed page, displaying the snapshot of the second directly accessed page in the designated location.

17. A system comprising:
one or more computers and one or more storage devices storing instructions that are operable, when executed by the one or more computers, to cause the one or more computers to perform operations comprising:
displaying a first graphical user interface (GUI) generated by a browser, wherein the first GUI includes a plurality of tabs corresponding to a plurality of web pages that are concurrently open in the browser;
while the plurality of web pages are concurrently open in the browser, detecting a user request to display a second GUI that corresponds to presentation of page groupings of the plurality of web pages that are concurrently open in the browser; and
in response to detecting the user request:
determining whether web pages of the plurality of web pages were accessed directly or indirectly, wherein a web page is determined to have been accessed indirectly if accessed by clicking on one or more hyperlinks and a web page is determined to have been accessed directly if accessed without clicking on one or more hyperlinks, wherein the plurality of web pages that are concurrently open in the browser include at least a first directly accessed page corresponding to a first tab of the plurality of tabs, a second directly accessed page corresponding to a second tab of the plurality of tabs, a first indirectly accessed page corresponding to a third tab of the plurality of tabs that was accessed via a link in the first directly accessed page, and a second indirectly accessed page corresponding to a fourth tab of the plurality of tabs that was accessed via a link in the second directly accessed page, grouping the plurality of web pages into a plurality of page groups, including: a first page group containing the first directly accessed page and the first indirectly accessed page that was accessed via a link in the first directly accessed page; and a second page group containing the second directly accessed page and the second indirectly accessed page that was accessed via a link in the second directly accessed page, and ceasing to display the first GUI, displaying the second GUI that includes displaying a first region that includes a snapshot of the first directly accessed page and a snapshot of the second directly accessed page, wherein the snapshot of the first directly accessed page is displayed in a designated location that is visually distinct from other snapshots associated with other directly accessed web pages within the first region; and in accordance with a determination that the snapshot of the first directly accessed page is displayed in the designated location:

displaying a snapshot of the first indirectly accessed page that is assigned to the first page group in a second region of the second GUI, wherein the second region is visually separated from the first region within the second GUI, and forgoing display of a snapshot of the second indirectly accessed page that is assigned to the second page group.

18. The system of claim 17, wherein a page of the plurality of web pages is determined to be indirectly accessed if the page was accessed by clicking on a hypertext link, and is determined to be directly accessed if the page was accessed by requesting the page through direct entry of a uniform resource locator associated with the page or using a bookmark.

19. The system of claim 17, wherein the snapshot of the first directly accessed page is displayed in a distinguishing manner relative to the snapshot of the second directly accessed page while displayed in the designated location.

20. The system of claim 17, wherein the plurality of web pages is actively open in tabs in a browser session.

21. The system of claim 17, the operations further comprising receiving a request to open a webpage from a second link in the first directly accessed webpage, and in response, opening the webpage and adding the webpage to the first page group.

22. The system of claim 17, wherein the snapshot of the first directly accessed page and the snapshot of the second directly accessed page are displayed in a carousel within the first region of the second GUI.

23. The system of claim 17, wherein the operations further comprise, in response to the user request:

in accordance with a determination that the snapshot of the second directly accessed page is displayed in the designated location:

displaying the snapshot of the second indirectly accessed page that is assigned to the second page group in the second region of the second GUI; and forgoing display of the snapshot of the first indirectly accessed page that is assigned to the first page group.

24. The system of claim 23, wherein the operations further comprise:

while the snapshot of the first directly accessed page in displayed in the designated location, receiving a user input indicative of the snapshot of the second directly accessed page; and in response to receiving the user input indicative of the snapshot of the second directly accessed page, displaying the snapshot of the second directly accessed page in the designated location.

* * * * *